Sept. 5, 1950     H. B. HOWARD, SR     2,521,581
POTATO DIGGER WITH SOIL PULVERIZING AND SIFTING SCREW Filed March 11, 1947     2 Sheets-Sheet 1

Inventor
Hugh B. Howard, Sr.

By Clarence A. O'Brien
and Harvey B. Jacobson
Attorneys

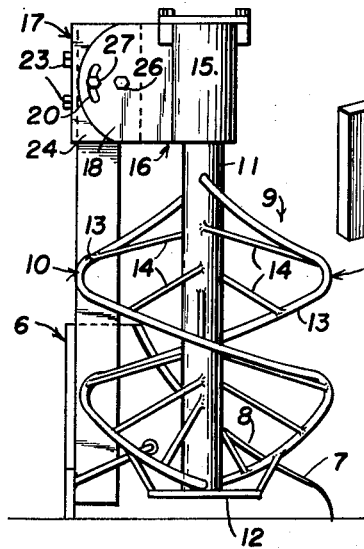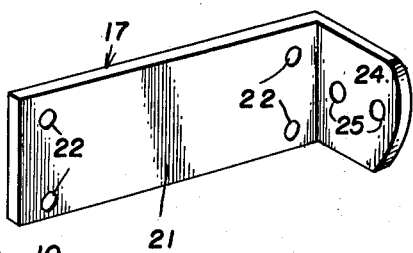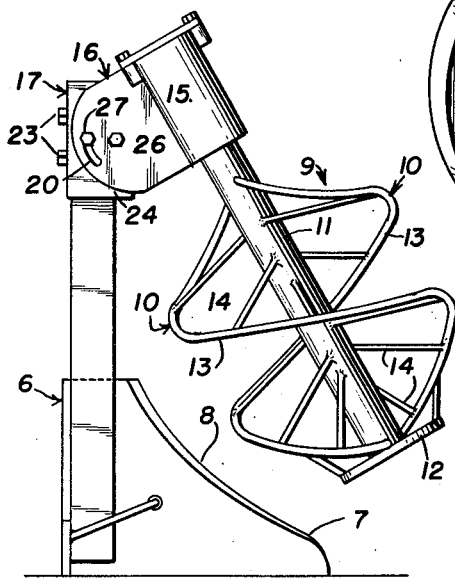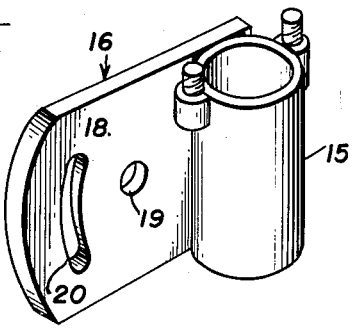

UNITED STATES PATENT OFFICE 2,521,581

POTATO DIGGER WITH SOIL PULVERIZING AND SIFTING SCREW

Hugh B. Howard, Sr., Pittsburg, Tex.

Application March 11, 1947, Serial No. 733,961

5 Claims. (Cl. 55—56)

This invention relates to improvements in potato diggers of the type embodying a plow having a plowshare, and a rotatable soil and potato separating screw positioned directly behind the plowshare to receive the soil and potatoes from the moldboard of the plowshare.

An important object of the present invention is to provide a potato digger of the above kind which is comparatively simple in construction and efficient in operation, and which embodies a novel soil and potato separating screw which is rotated by the soil and potatoes received from the plowshare as the digger moves ahead.

Another object of the invention is to provide, in a potato digger of the above kind, a novel rotatable soil and potato separating screw which requires no driving means and may be readily installed upon the beam of a plow.

The exact nature of the present invention, as well as other objects and features thereof, will become apparent from the following description when considered in connection with the accompanying drawings, in which:

Figure 3 is a rear elevational view thereof.

Figure 4 is a view similar to Figure 3 with the soil and potato separating screw tilted to an inoperative position.

Figure 5 is an enlarged perspective view of one member of the mounting bracket for the soil and potato separating screw.

Figure 6 is an enlarged perspective view of the other bracket member for the soil and potato separating screw.

Figure 1:
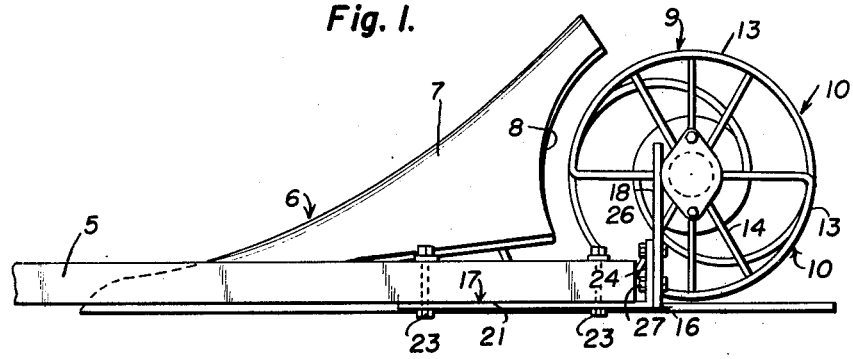
Figure 1 is a fragmentary top plan view of a potato digger constructed in accordance with the present invention.
Figure 2:
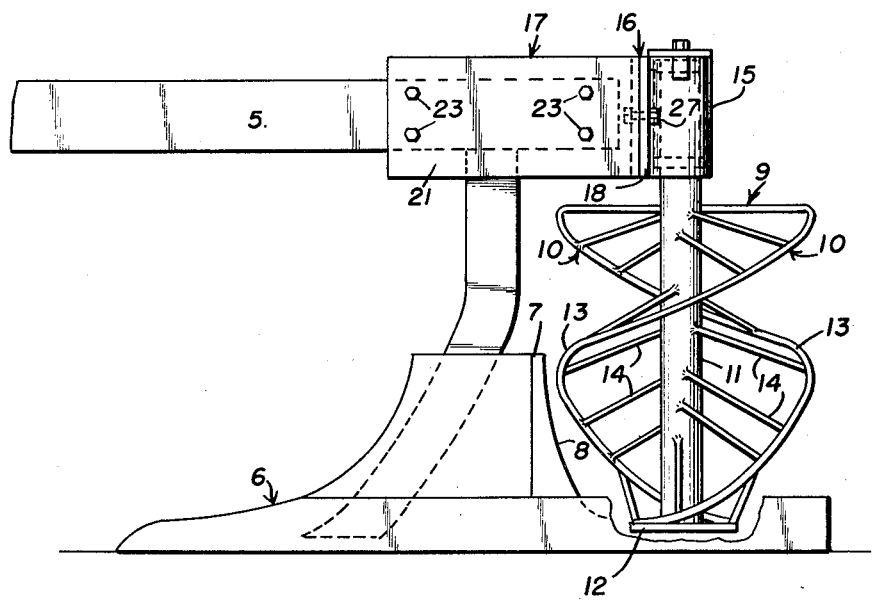
Figure 2 is a side elevational view thereof, partly broken away.

Referring in detail to the drawings, the illustrated embodiment of the invention includes a conventional type of plow embodying a plow-beam 5, and a plowshare 6 whose moldboard 7 is shortened by cutting the same away at the rear as at 8, so that the potato hills are turned up but not completely over.

Mounted on the rear of the plow-beam 5 so as to depend therefrom directly behind the plowshare 6, is a substantially upright freely rotatable soil pulverizing and sifting or soil and potato separating screw 9. The screw 9 is positioned to receive the soil and potatoes from the moldboard 7, and it has two oppositely disposed reticulated or foraminous helicoid blades 10 which are engaged by the upturned soil and potatoes as the digger moves ahead, so as to cause said screw 9 to rotate. When the screw 9 is thus rotated, it elevates the potatoes and soil and pulverizes or breaks up the soil, ultimately allowing the broken soil and potatoes to fall onto the ground behind the digger so that the potatoes are exposed for being readily gathered.

As shown, the screw 9 preferably consists of a shaft 11 which carries the blades 10 and which has a disc 12 fixed on the lower end thereof. The blades 10 extend upwardly from the disc 12, and each blade preferably consists of a helical rod 13 connected with the shaft 11 by spaced radiating rods 14. When the screw 9 rotates, soil is received on the blades 10, and the soil and potatoes are then caused to move upwardly on the blades 10 as the screw 9 continues to rotate. The radiating bars 14 strike the soil and break the same up, the broken soil and potatoes falling ultimately to the ground through or off of the blades. The soil is effectively broken up so that the soil and potatoes are separated and fall onto the ground with the potatoes exposed for being readily gathered.

The upper end of shaft 11 is freely journalled in a bearing sleeve 15 of a mounting bracket composed of two sections 16 and 17. The section 16 consists of a plate 18 having the bearing sleeve 15 fixed on one end thereof and provided with a circular opening 19 and an arcuate slot 20 concentric with said opening 19. Suitable anti-friction bearings are preferably provided between the shaft 11 and the bearing sleeve 15 so as to promote the ease of rotation of the screw 9. The mounting bracket section 17 includes an elongated plate 21 apertured at 22 to facilitate rigid bolting thereof to one side of the plow-beam 5 at the rear end portion of the latter, as at 23, said plate 21 having a right angular extension 24 on its rear end which is provided with a pair of spaced circular openings 25. A pivot bolt 26 passes through the opening 19 of section 16 and one of the openings 25 of section 17 so as to pivotally connect the sections in a manner to permit lateral tilting of the screw 9. A clamping bolt 27 is passed through the other opening 25 and through the slot 20 for permitting the lateral tilting of the screw 9 and for securing it in different laterally tilted positions. Slight adjustments of this nature are required for most efficient action of the screw 9 according to soil and other conditions. Also, when the screw 9 is in its extreme tilted position as shown in Figure 4, it is rendered inoperative and facilitates transportation of the digger when the latter is not in use.

In actual practice, the present digger has been found very efficient in operation. No driving means is required for the screw 9, and it may be readily installed upon a plow having the mold-board thereof shortened as described so as to provide a highly desirable potato digger. There are a minimum number of simple parts which may be economically and readily manufactured.

From the foregoing description, it is believed that the construction, operation and advantages of the present invention will be readily understood and appreciated by those skilled in the art. It will be apparent that the plow may be of a wheeled type or of the kind that is tractor-mounted. However, for simplicity, the plow proper alone is shown and is illustrated in a somewhat diagrammatic manner. It is also pointed out that modifications and changes in details of construction are contemplated, such as fall within the scope of the invention as claimed.

What I claim is:

1. The combination with a plow including a beam, and a plowshare having a shortened mold-board, of a substantially upright freely rotatable soil and potato separating screw suspended from the rear of the plow-beam directly behind the plowshare, said screw being positioned to receive the soil and potatoes from the mold-board and having a reticulated helicoid soil pulverizing and sifting blade engageable by the upturned soil and potatoes so as to cause rotation of said screw upon forward movement of the plow.

2. The combination with a plow including a beam, and a plowshare having a shortened mold-board, of a substantially upright freely rotatable soil and potato separating screw suspended from the rear of the plow-beam directly behind the plowshare, said screw comprising a shaft having a disc centrally fixed on the lower end thereof, and two oppositely disposed reticulated helicoid sifting blades directly carried by said shaft and directly connected at their lower ends to the margin of said disc, said screw being positioned to receive the soil and potatoes from the mold-board so that the blades are engaged by the upturned soil and potatoes to cause rotation of said screw upon forward movement of the plow.

3. A potato and soil separating device for attachment to a plow, comprising a bracket adapted to be fixed to the beam of the plow and having a bearing, a substantially upright freely rotatable soil and potato separating screw including a shaft suspended from and journalled at its upper end in said bearing, and two oppositely disposed reticulated helicoid soil pulverizing and sifting blades directly carried by said shaft.

4. The construction defined in claim 3, wherein said bracket comprises a fixed section, and a second section pivoted to the fixed section for permitting tilting of the rotatable member laterally of the plow, and means co-acting with said bracket sections to secure the rotatable member in different laterally tilted positions.

5. The construction defined in claim 3, wherein each of said helicoid blades includes a helical rod, and other rods radiating from the shaft and connecting said helical rod to the latter, said other rods being arranged in spaced relation.

HUGH B. HOWARD, Sr.

REFERENCES CITED

The following references are of record in the file of this patent:

UNITED STATES PATENTS

| Number | Name | Date |
| --- | --- | --- |
| 39,475 | Ford | Aug. 11, 1863 |
| 110,434 | Clark | Dec. 7, 1870 |
| 387,278 | Aspinwall | Aug. 7, 1888 |
| 645,597 | Keller | Mar. 20, 1900 |
| 2,063,584 | Collins | Dec. 8, 1936 |
| 2,079,595 | Collins | May 11, 1937 |

FOREIGN PATENTS

| Number | Country | Date |
| --- | --- | --- |
| 521,814 | Germany | Mar. 27, 1931 |